(12) United States Patent
Shiraga

(10) Patent No.: US 7,006,830 B2
(45) Date of Patent: Feb. 28, 2006

(54) WIRELESS COMMUNICATION SYSTEM

(75) Inventor: Kazuhiro Shiraga, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/826,118

(22) Filed: Apr. 16, 2004

(65) Prior Publication Data

US 2004/0196807 A1    Oct. 7, 2004

Related U.S. Application Data

(62) Division of application No. 09/844,306, filed on Apr. 27, 2001, now Pat. No. 6,804,523.

(51) Int. Cl.
*H04Q 7/20*    (2006.01)

(52) U.S. Cl. ............... 455/450; 455/456.1; 455/456.3; 455/456.6

(58) Field of Classification Search ............... 455/450, 455/456.1, 456.3, 456.6, 457, 62, 566, 412, 455/41.2, 38, 446; 370/329, 227
See application file for complete search history.

(56) References Cited

U.S. PATENT DOCUMENTS

| | | | |
|---|---|---|---|
| 6,317,605 B1 * | 11/2001 | Sakuma | 455/457 |
| 6,389,273 B1 * | 5/2002 | Brandenburg | 455/296 |
| 6,496,490 B1 * | 12/2002 | Andrews et al. | 370/329 |
| 2002/0015176 A1 * | 2/2002 | Takao et al. | 358/1.15 |
| 2002/0052183 A1 * | 5/2002 | Tokoro | 455/41 |
| 2004/0010372 A1 * | 1/2004 | Schwoegler | 702/3 |
| 2004/0209627 A1 * | 10/2004 | Shiraga | 455/456.1 |

* cited by examiner

*Primary Examiner*—Tilahun Gesesse
*Assistant Examiner*—Trinh Tan
(74) *Attorney, Agent, or Firm*—Pearne & Gordon LLP

(57) ABSTRACT

To provide a wireless communication system and a wireless communication method including: a first terminal apparatus comprising a computer main body and a second terminal apparatus comprising a displaying section, wherein the two terminal apparatuses perform wireless communication with each other without communication crossing. A management center obtains the positional information of a first terminal apparatus, and then records the positional information. The management center determines a communication channel free from communication crossing, depending on the positional information. The communication channel determined by the management center is transmitted to the first terminal apparatus. The first terminal apparatus and a second terminal apparatus perform wireless communication with each other through the received communication channel.

2 Claims, 10 Drawing Sheets

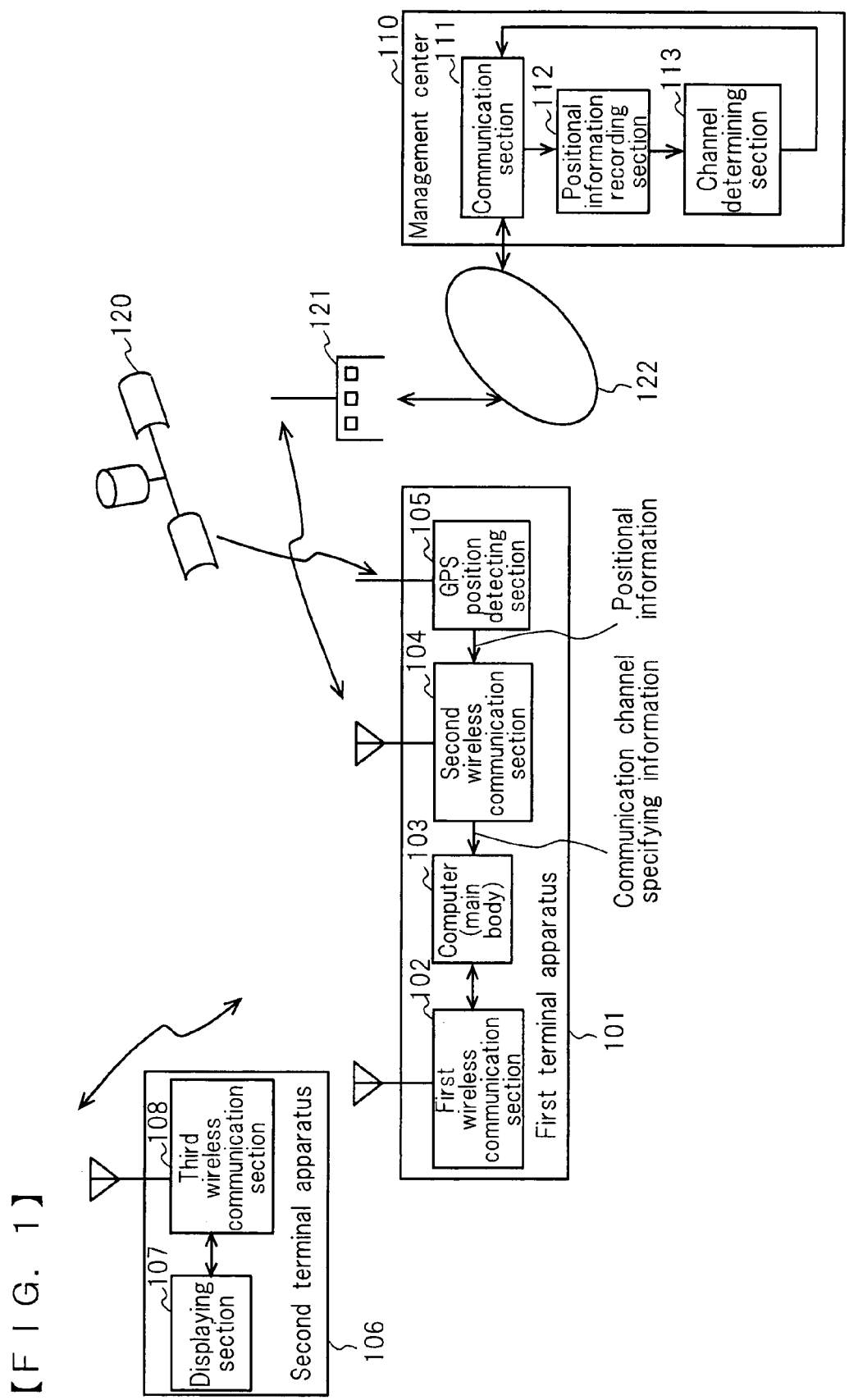

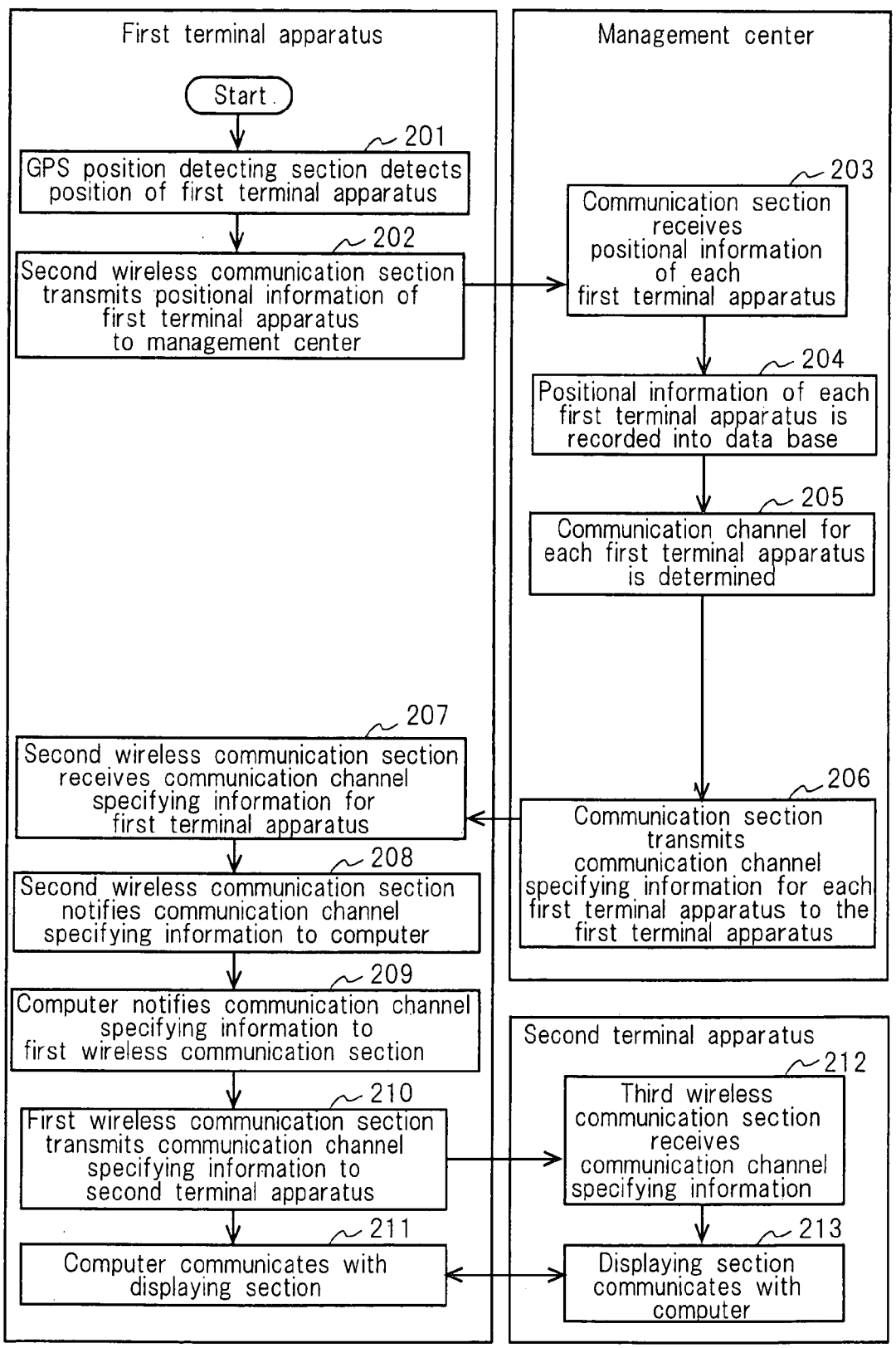
[FIG. 2]

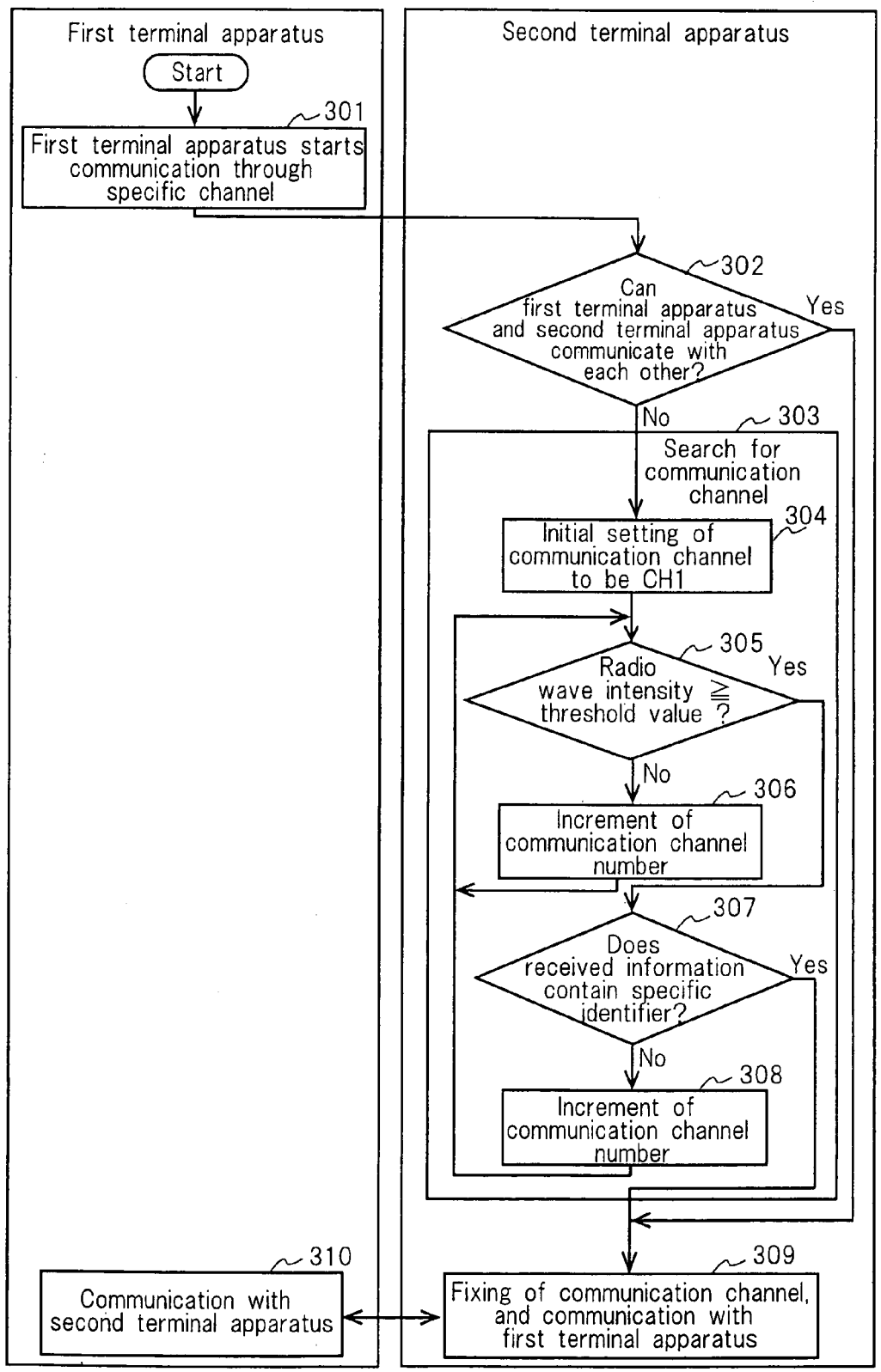
[FIG. 3]

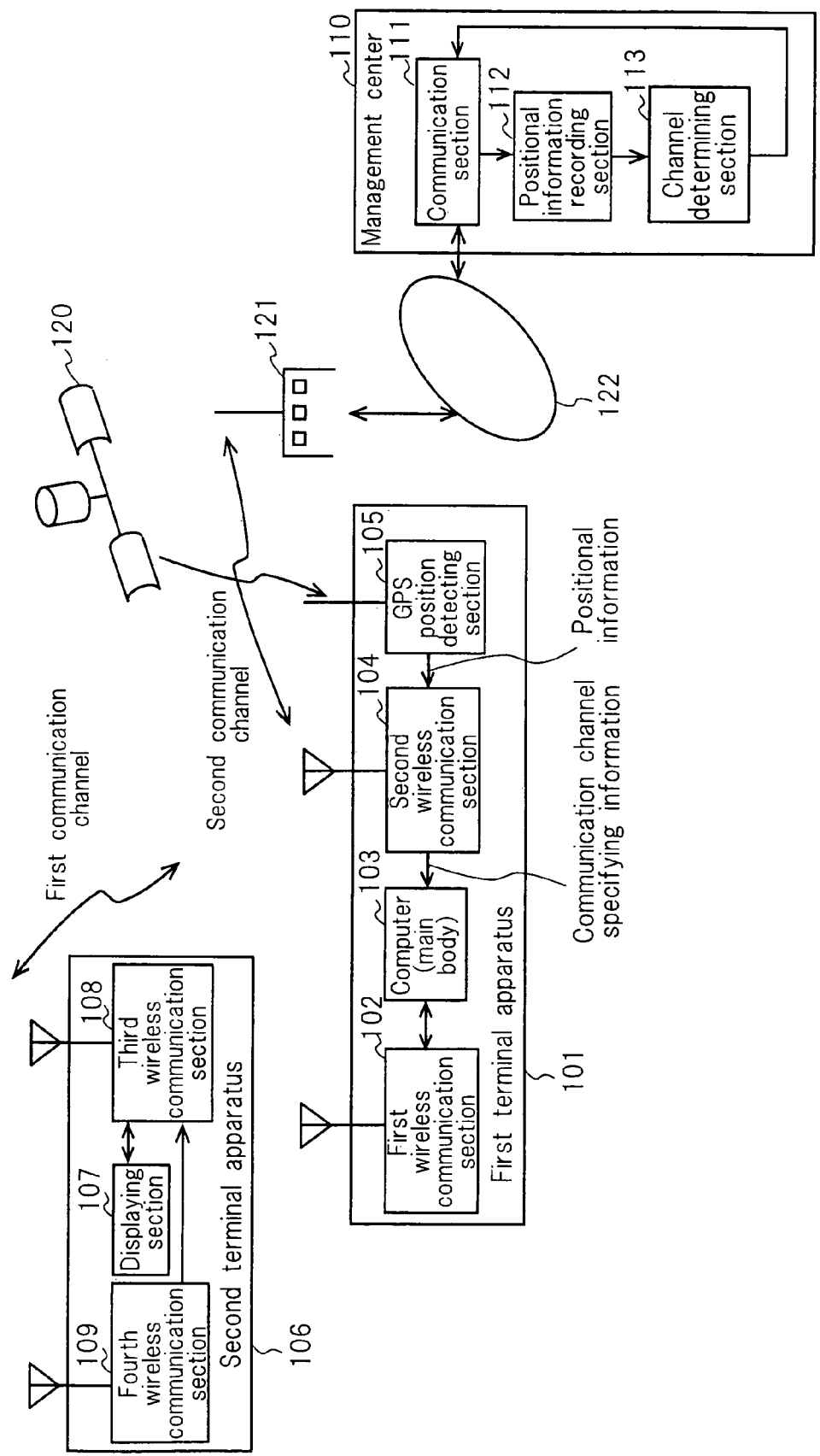
[F I G. 4]

[FIG. 5]
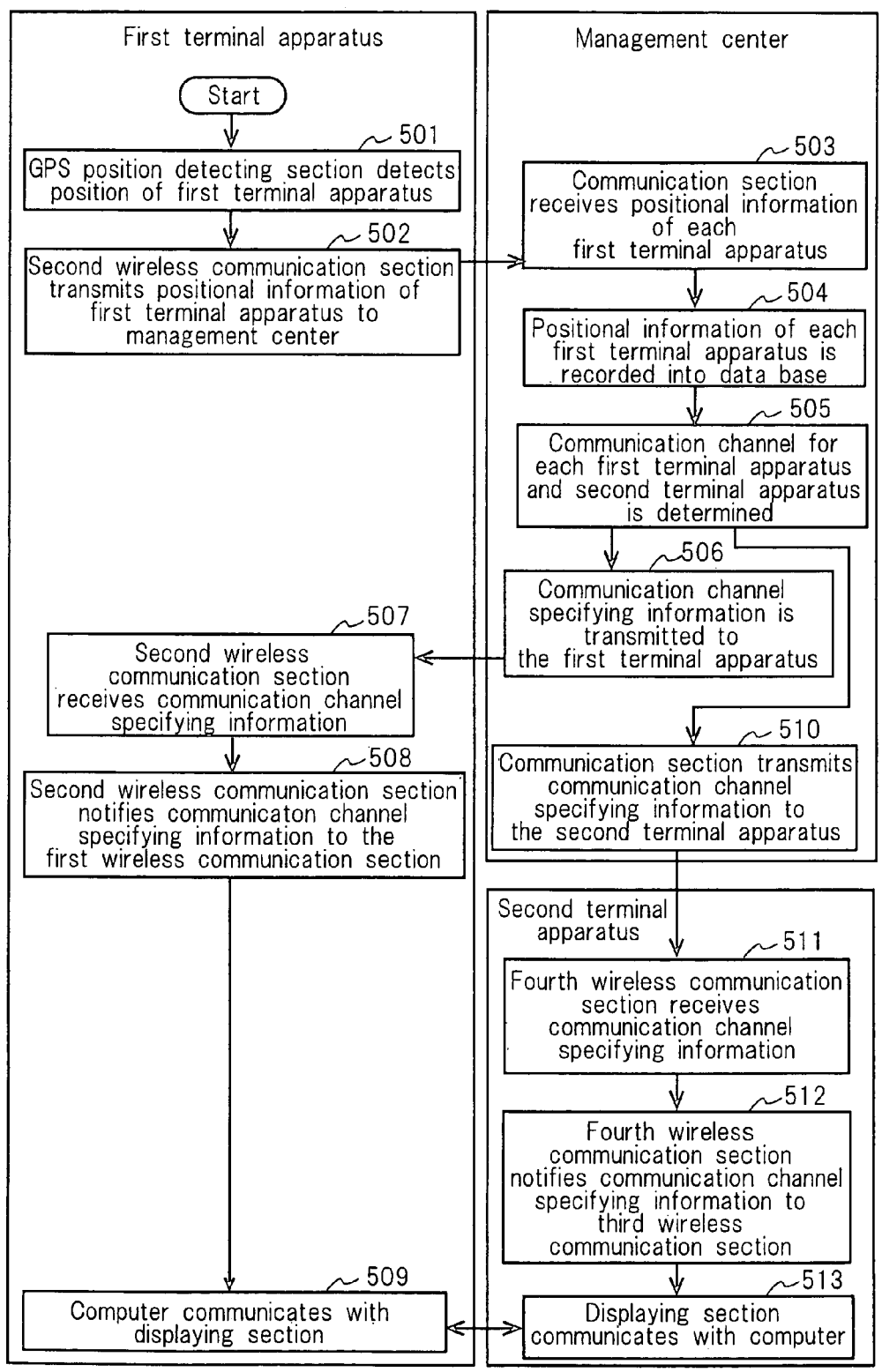

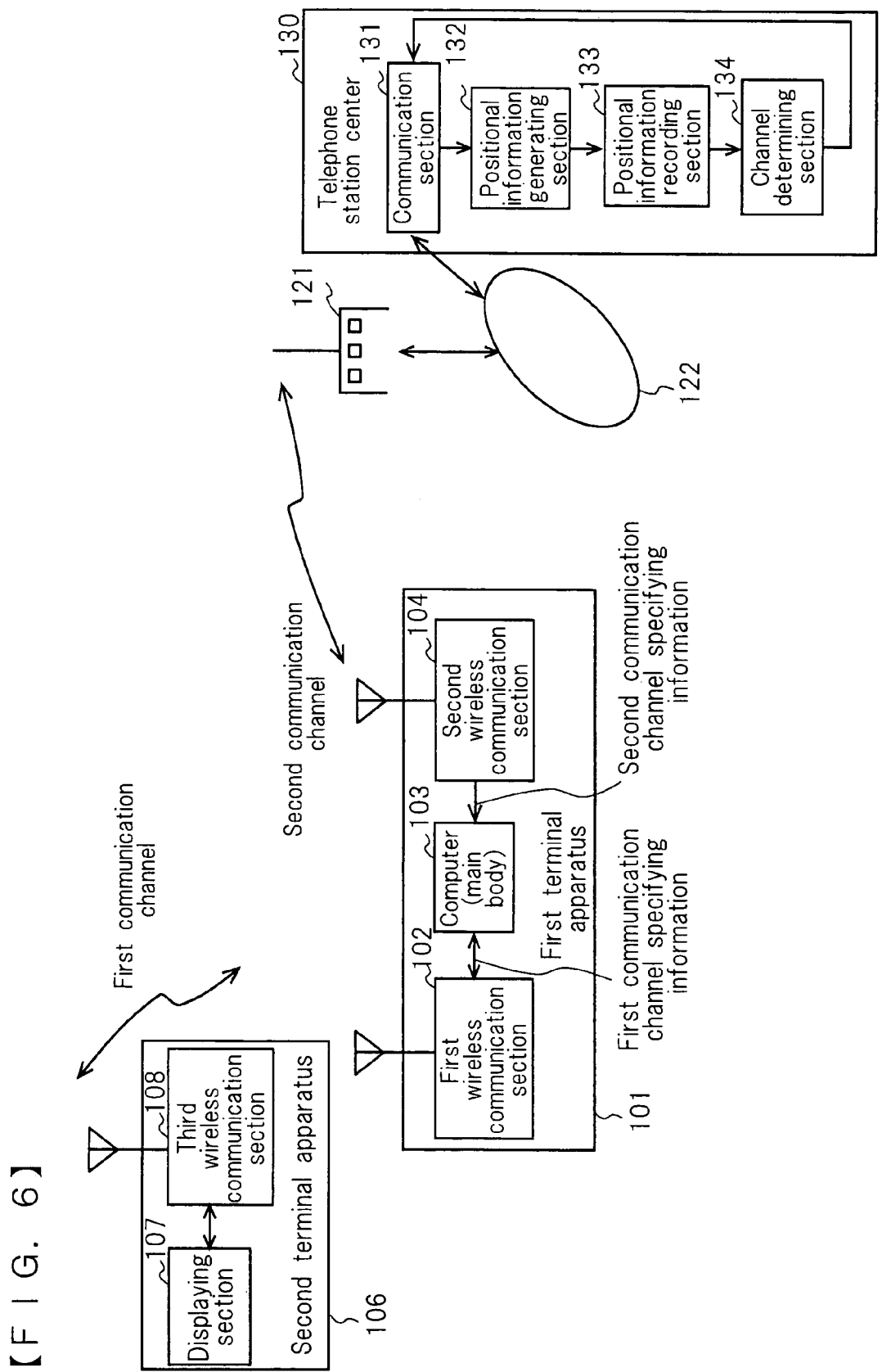

[FIG. 7]
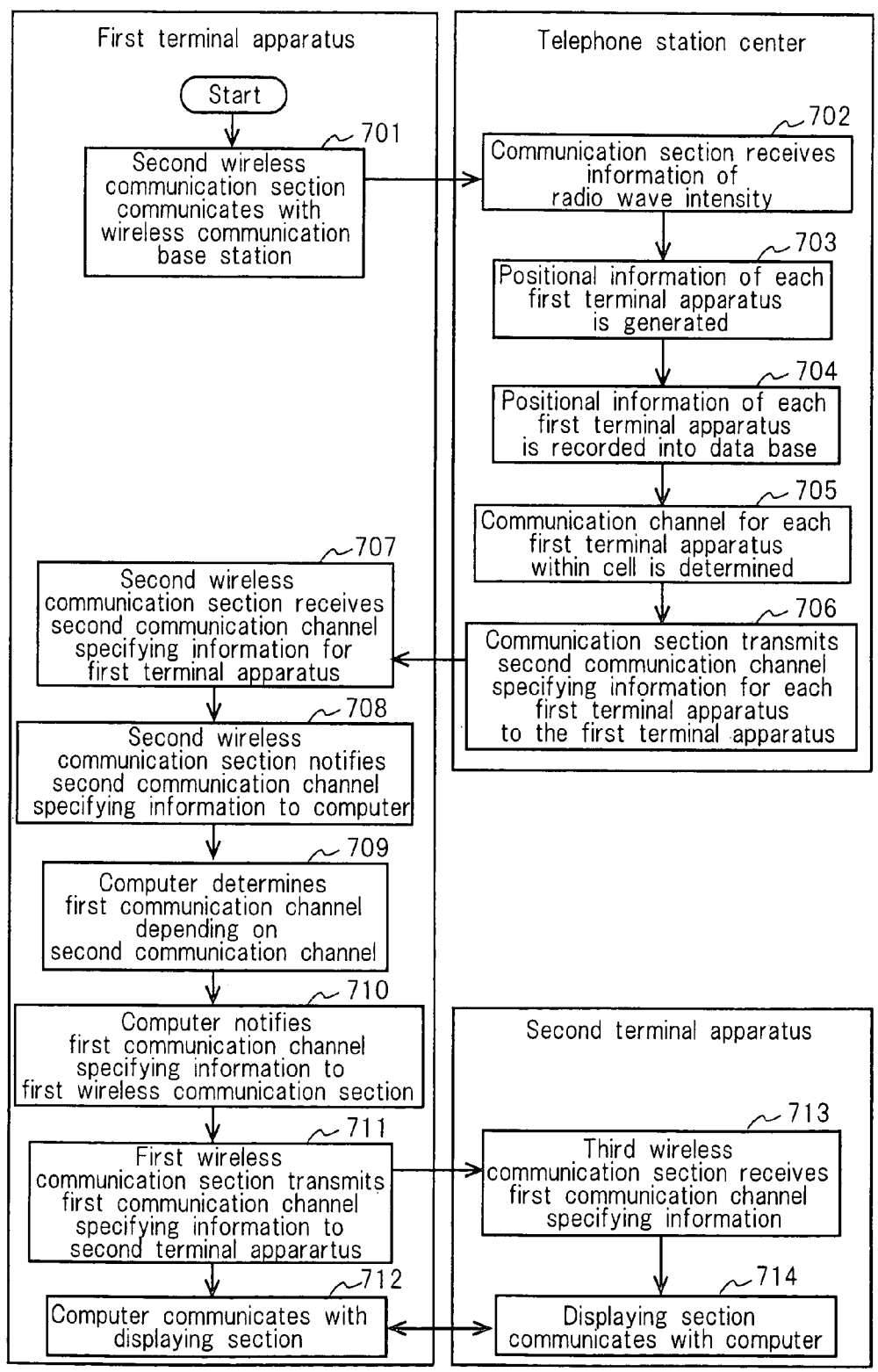

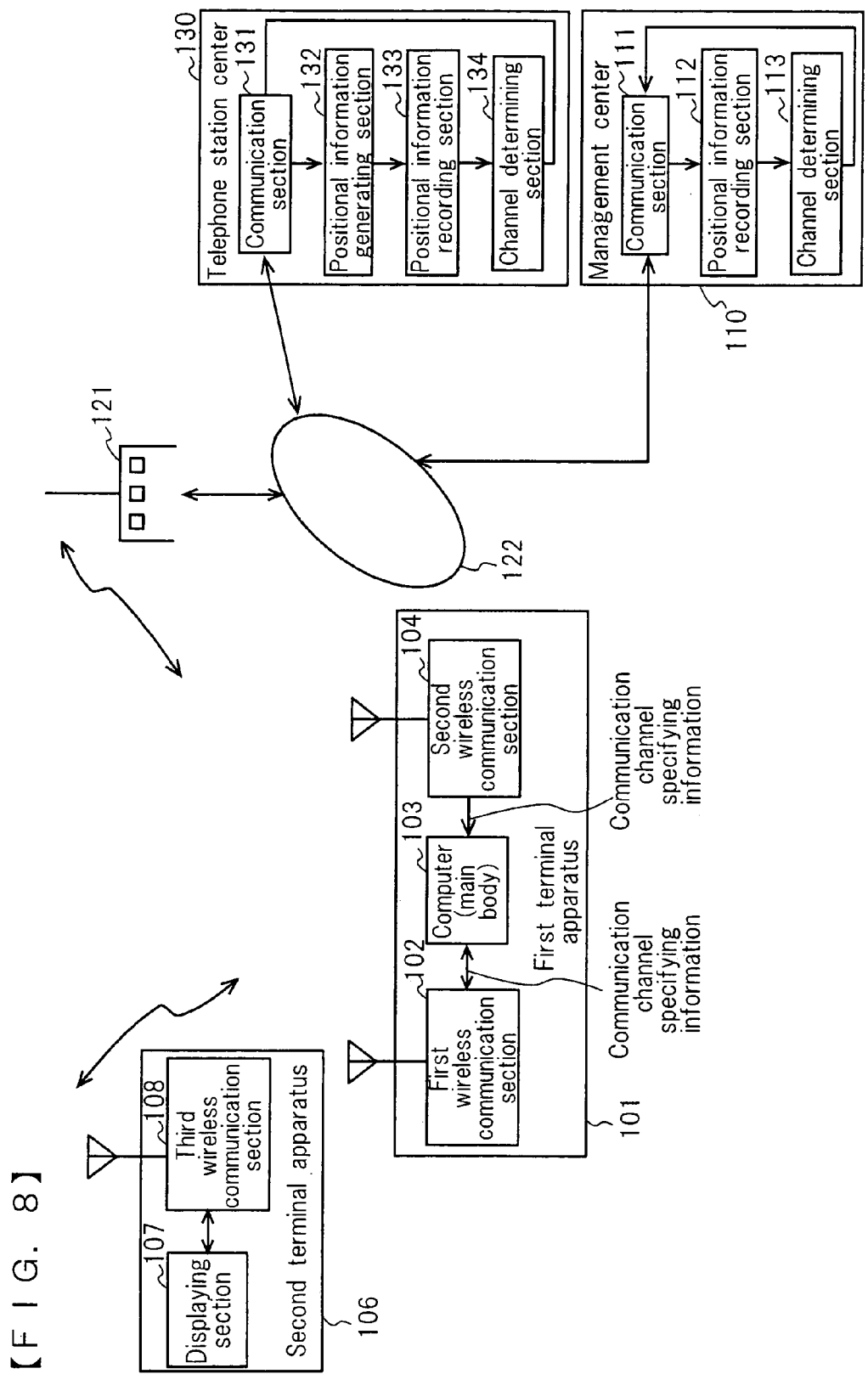

[FIG. 9]
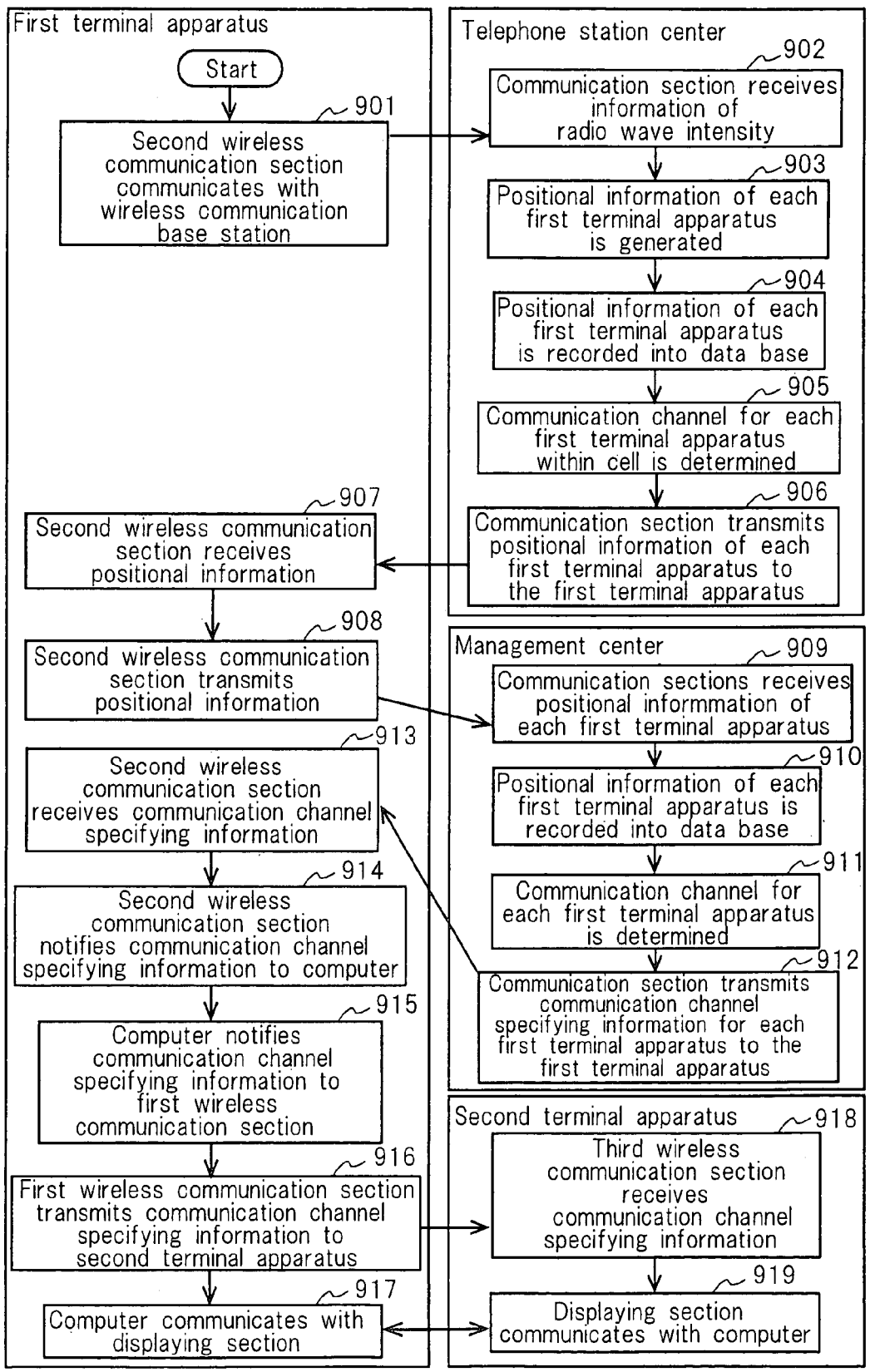

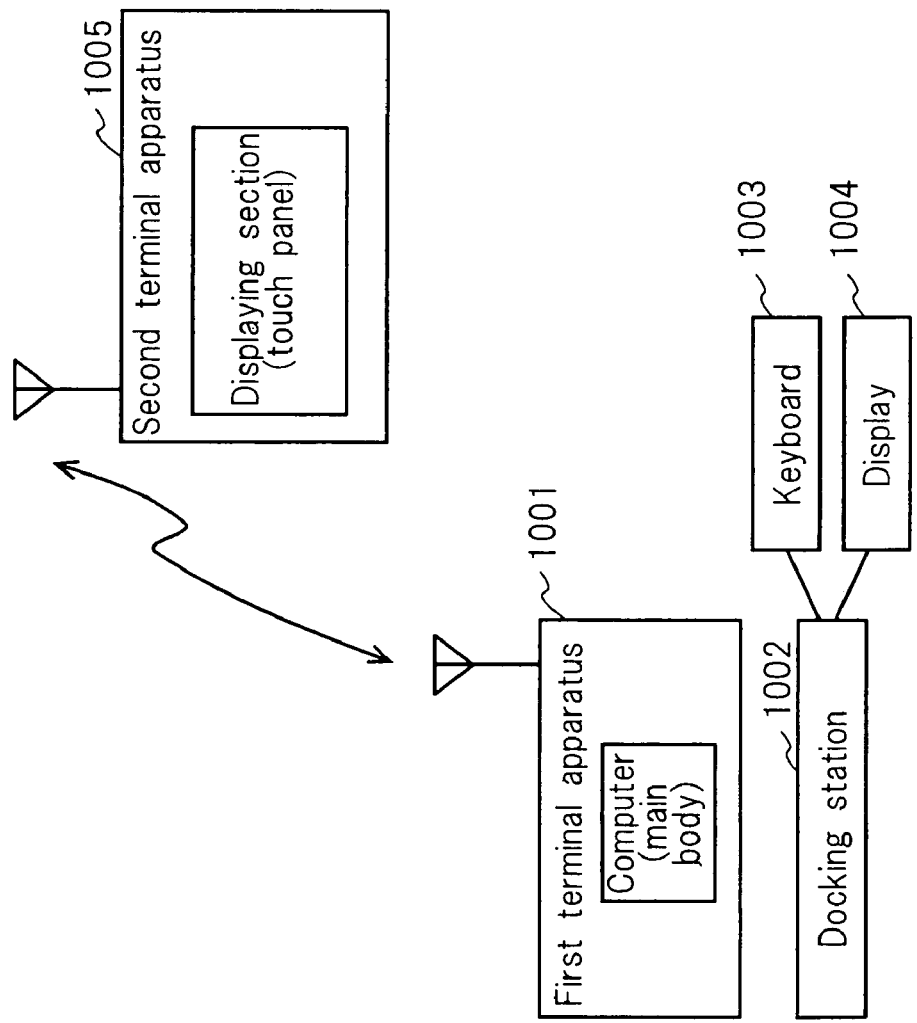
[FIG. 10]

WIRELESS COMMUNICATION SYSTEM

This is a division of application Ser. No. 09/844,306, filed Apr. 27, 2001, now U.S. Pat. No. 6,804,523.

BACKGROUND OF THE INVENTION

The present invention relates to a wireless communication system.

With expansion of the field of application of computers, there is a growing market demand for those computers consisting of two separate units of a computer main body (referred to as "a first terminal apparatus") and a display apparatus (or alternatively, a displaying section and a pen inputting section) (referred to as "a second terminal apparatus"). In such an apparatus, a first terminal apparatus is carried, for example, on an automobile. Using a second terminal apparatus, even a user freely moving around can operate the computer and watch the displayed screen. Wireless communication between the first and the second terminal apparatuses permits the user to move around freely within the reach of the wireless communication, thereby imparting a higher convenience to the apparatus. In such a wireless communication system, in order to avoid communication crossing among terminal apparatuses, an arbitrary channel is selected from a plurality of communication channels and used for communication.

With reference to FIG. 10, described below is an apparatus consisting of: a first terminal apparatus comprising a computer main body; and a second terminal apparatus comprising a displaying section.

FIG. 10 is a schematic configuration diagram of the wireless communication system.

In FIG. 10, numeral 1001 indicates a first terminal apparatus comprising a computer main body. Numeral 1002 indicates a docking station. Numeral 1003 indicates a keyboard. Numeral 1004 indicates a display. Numeral 1005 indicates a second terminal apparatus comprising a displaying section. Image data generated by the computer of the first terminal apparatus 1001 is transmitted to the second terminal apparatus 1005 by wireless. The displaying section of the second terminal apparatus 1005 displays the screen depending on the received image data. The displaying section of the second terminal apparatus 1005 further serves as an input apparatus with a touch panel, an input pen, and the like thereby to transmit the input data to the first terminal apparatus 1001 by wireless. The computer of the first terminal apparatus 1001 processes the input data. The first terminal apparatus 1001 can be connected to the docking station 1002, which permits the connection both to an input apparatus such as a keyboard and to an output apparatus such as a display.

Meanwhile, not so many communication channels can be assigned to those apparatuses in which a computer (main body) and a displaying section can be used in separate units. Accordingly, when a plurality of such apparatuses are used nearby to each other, communication crossing occurs in some cases. An example of such cases is that a plurality of automobiles each provided with a computer (main body) (first terminal apparatus) gather at a location and that the automobile drivers each having a displaying section (second terminal apparatus) work in communicating with their respective first terminal apparatuses. In case that a fixed communication channel is assigned to each apparatus, it is not probable that no duplication occurs in the communication channels among all of the apparatuses within the reach of radio waves. In particular, in case that the apparatuses are carried on automobiles and the like and hence movable, the communication crossing is difficult to avoid.

Further, in case that the communication channels are selected by the terminal apparatuses exchanging the positional information with each other, it is necessary to accurately obtain the positional information and the communication channels for all of the apparatuses within the reach of radio waves. This causes a difficulty in avoiding the communication crossing.

A wireless telephone system is a system in which communication channels are managed to avoid the communication crossing. However, because of the limit in information transfer rate, large data such as image information can not be transmitted in the system.

No prior art wireless communication system has been capable of resolving the above-mentioned problem.

An object of the present invention is to resolve the above-mentioned problem. More specifically, an object of the present invention is to provide a wireless communication system in which for example, a management center maintains a data base of the positional information of apparatuses thereby to assign communication channels, whereby computers (main bodies) and corresponding displaying sections can communicate with each other without communication crossing even in case that a plurality of those apparatuses in which the computer (main body) and the displaying section can be used in separate units are used nearby to each other.

SUMMARY OF THE INVENTION

In order to resolve the above-mentioned problem, the present invention has the following configurations.

The present invention of claim 1 is a wireless communication system comprising a first terminal apparatus and a second terminal apparatus, wherein said first terminal apparatus comprises: a position detecting section for detecting the positional information of said first terminal apparatus; a computer for generating image information; and a first wireless communication section for transmitting said image information to a third wireless communication section of said second terminal apparatus through a first communication channel defined depending on said positional information; and wherein said second terminal apparatus comprises: said third wireless communication section for receiving said image information; and a displaying section for displaying said image information.

The present invention of claim 2 is a wireless communication system comprising a first terminal apparatus, a second terminal apparatus, and a management center, wherein said first terminal apparatus comprises: a position detecting section for detecting the positional information of said first terminal apparatus; a computer for generating image information; a first wireless communication section for transmitting said image information to a third wireless communication section of said second terminal apparatus through a first communication channel; and a second wireless communication section for transmitting said positional information to a communication section of said management center, for receiving first communication channel specifying information specifying said first communication channel from said communication section of said management center, and for transferring said first communication channel specifying information to said first wireless communication section; wherein said second terminal apparatus comprises: said third wireless communication section for receiving said image information; and a displaying section for displaying said image information; and wherein said management center comprises: said communication section for receiving said positional information and for transmitting said first communication channel specifying information; and a first communication channel determining section for determining said first communication channel specifying information depending on said positional information.

The present invention of claim 3 is a wireless communication system comprising a first terminal apparatus and a second terminal apparatus, wherein said first terminal apparatus comprises: a computer for generating image information; a first wireless communication section for performing first wireless communication through a first communication channel defined depending on a second communication channel thereby to transmit said image information to a third wireless communication section of said second terminal apparatus; and a second wireless communication section for receiving, from a wireless communication base station, second communication channel specifying information specifying said second communication channel which is a communication channel used for wireless communication with said wireless communication base station; and wherein said second terminal apparatus comprises: said third wireless communication section for receiving said image information; and a displaying section for displaying said image information.

The present invention of claim 4 is a wireless communication system comprising a first terminal apparatus, a second terminal apparatus, and a management center, wherein said first terminal apparatus comprises: a computer for generating image information; a first wireless communication section for transmitting said image information to a third wireless communication section of said second terminal apparatus through a first communication channel; and a second wireless communication section for performing wireless communication with a wireless communication base station thereby to receive the positional information of said first terminal apparatus from said wireless communication base station, for transmitting said positional information to a communication section of said management center, for receiving first communication channel specifying information specifying said first communication channel from said communication section of said management center, and for transferring said first communication channel specifying information to said first wireless communication section; wherein said second terminal apparatus comprises: said third wireless communication section for receiving said image information; and a displaying section for displaying said image information; and wherein said management center comprises: said communication section for receiving said positional information and for transmitting said first communication channel specifying information; and a first communication channel determining section for determining said first communication channel specifying information depending on said positional information.

The present invention of claim 5 is a wireless communication system of any one of claims 1 to 4, wherein said third wireless communication section of said second terminal apparatus determines a first communication channel depending on said first communication channel specifying information transmitted from said first wireless communication section, or said third wireless communication section determines, as said first communication channel, a communication channel through which information containing an identifier identical to that being stored is received.

The present invention of claim 6 is a wireless communication system of any one of claims 2 to 4, wherein said second terminal apparatus further comprises a fourth wireless communication section, and wherein said fourth wireless communication section receives said first communication channel specifying information from either said communication section of said management center or said second wireless communication section, and transfers said first communication channel specifying information to said third wireless communication section.

The present invention of claim 7 is a method for controlling a wireless communication system comprising a first terminal apparatus and a second terminal apparatus, said method comprising: position detecting step in which said first terminal apparatus detects the positional information of said first terminal apparatus; image information generating step in which said first terminal apparatus generates image information; wireless communication step in which said first terminal apparatus transmits said image information to said second terminal apparatus through a first communication channel defined depending on said positional information; wireless communication step in which said second terminal apparatus receives said image information; and displaying step in which said second terminal apparatus displays said image information.

The present invention of claim 8 is a method for controlling a wireless communication system comprising a first terminal apparatus, a second terminal apparatus, and a management center, said method comprising: position detecting step in which said first terminal apparatus detects the positional information of said first terminal apparatus; transmitting step in which said first terminal apparatus transmits said positional information to said management center by wireless; receiving step in which said management center receives said positional information; communication channel determining step in which said management center determines first communication channel specifying information specifying a first communication channel, depending on said positional information; communication step in which said management center transmits said first communication channel specifying information to said first terminal apparatus; receiving step in which said first terminal apparatus receives said first communication channel specifying information; image information generating step in which said first terminal apparatus generates image information; wireless communication step in which said first terminal apparatus transmits said image information to said second terminal apparatus through said first communication channel by wireless; wireless communication step in which said second terminal apparatus receives said image information by wireless; and displaying step in which said second terminal apparatus displays said image information.

The present invention of claim 9 is a method for controlling a wireless communication system comprising a first terminal apparatus and a second terminal apparatus, said method comprising: wireless communication step in which said first terminal apparatus receives, from a wireless communication base station, second communication channel specifying information specifying a second communication channel which is a communication channel used for wireless communication with said wireless communication base station; image information generating step in which said first terminal apparatus generates image information; wireless communication step in which said first terminal apparatus transmits said image information to said second terminal apparatus by wireless through a first communication channel defined depending on said second communication channel; wireless communication step in which said second terminal apparatus receives said image information by wireless; and displaying step in which said second terminal apparatus displays said image information.

The present invention of claim 10 is a method for controlling a wireless communication system comprising a first terminal apparatus, a second terminal apparatus, and a management center, said method comprising: receiving step in which said first terminal apparatus performs wireless communication with a wireless communication base station thereby to receive the positional information of said first terminal apparatus from said wireless communication base station; transmitting step in which said first terminal apparatus transmits said positional information to said management center by wireless; receiving step in which said management center receives said positional information; communication channel determining step in which said management center determines first communication channel specifying information specifying a first communication channel, depending on said positional information; communication step in which said management center transmits said first communication channel specifying information to said first terminal apparatus; receiving step in which said first terminal apparatus receives said first communication channel specifying information by wireless; image information generating step in which said first terminal apparatus generates image information; wireless communication step in which said first terminal apparatus transmits said image information to said second terminal apparatus through said first communication channel by wireless; wireless communication step in which said second terminal apparatus receives said image information by wireless; and displaying step in which said second terminal apparatus displays said image information.

The present invention of claim 11 is a method for controlling a wireless communication system of any one of claims 7 to 10, said method further comprising: communication channel determining step in which said second terminal apparatus receives said first communication channel specifying information transmitted from said first terminal apparatus by wireless and then determines a first communication channel depending on said first communication channel specifying information, or in which said second terminal apparatus determines, as said first communication channel, a communication channel through which information containing an identifier identical to that being stored is received.

The present invention of claim 12 is a method for controlling a wireless communication system of claim 8 or 10, said method further comprising: receiving step in which said second terminal apparatus receives said first communication channel specifying information from said management center by wireless.

The present invention realizes a wireless communication system in which first terminal apparatuses and corresponding second terminal apparatuses can perform data communication with each other without communication crossing with the other terminal apparatuses.

The novel features of the invention will be hereinafter fully described and particularly pointed out in the appended claims, and the configuration and details of the invention, together with other objects and features thereof, will become better understood and appreciated by reference to the following detailed description when considered in conjunction with the accompanying drawings.

BRIEF DESCRIPTION OF THE DRAWINGS

FIG. 1 is a configuration diagram of a wireless communication system of Embodiment 1 of the present invention.

FIG. 2 is a flow chart of a wireless communication system of Embodiment 1 of the present invention.

FIG. 3 is a flow chart of a wireless communication system (between a first terminal apparatus and a second terminal apparatus) of Embodiment 1 of the present invention.

FIG. 4 is a configuration diagram of a wireless communication system of Embodiment 2 of the present invention.

FIG. 5 is a flow chart of a wireless communication system of Embodiment 2 of the present invention.

FIG. 6 is a configuration diagram of a wireless communication system of Embodiment 3 of the present invention.

FIG. 7 is a flow chart of a wireless communication system of Embodiment 3 of the present invention.

FIG. 8 is a configuration diagram of a wireless communication system of Embodiment 4 of the present invention.

FIG. 9 is a flow chart of a wireless communication system of Embodiment 4 of the present invention.

FIG. 10 is a schematic configuration diagram of a wireless communication system of the present invention.

It will be understood that all or part of the drawings are purely diagrammatic for illustrative purposes and do not necessarily present faithful depictions of the actual relative sizes or positions of the illustrated elements.

DETAILED DESCRIPTION OF THE INVENTION

Embodiments showing the best mode for carrying out the present invention in detail are described below with reference to the drawings.

<Embodiment 1>

A wireless communication system of Embodiment 1 of the present invention is described below with reference to FIGS. 1–3.

FIG. 1 is a configuration diagram of a wireless communication system of Embodiment 1 of the present invention.

In FIG. 1, numeral 101 indicates a first terminal apparatus. Numeral 106 indicates a second terminal apparatus. Numeral 110 indicates a management center. Numeral 120 indicates a GPS satellite. Numeral 121 indicates a wireless communication base station. Numeral 122 indicates a cable communication network. The first terminal apparatus 101 comprises a first wireless communication section 102, a computer (main body) 103, a second wireless communication section 104, and a GPS position detecting section 105. The second terminal apparatus 106 comprises a displaying section 107 and a third wireless communication section 108. The management center 110 comprises a communication section 111, a positional information recording section 112, and a channel determining section 113.

The GPS position detecting section 105 detects the position of itself (the first terminal apparatus 101) using the GPS satellite 120 (GPS stands for "global positioning system") (the position detection is carried out generally using four GPS satellites, however, in the figure, only one GPS satellite is representatively shown). The GPS position detecting section 105 notifies the obtained positional information to the second wireless communication section 104. The second wireless communication section 104 transmits the positional information of the first terminal apparatus 101 to the management center 110. The radio waves (positional information) output from the second wireless communication section 104 are received by the wireless communication base station 121. The positional information of the first terminal apparatus 101 is then notified to the management center 110 via the cable communication network 122.

The communication section 111 of the management center 110 notifies the notified positional information of the first terminal apparatus 101 to the positional information recording section 112. The positional information recording section 112 records the positional information into a data base. The channel determining section 113 determines a communication channel for the first terminal apparatus 101. The management center 110 receives the positional information of a plurality of first terminal apparatuses thereby to record and manage it. The channel determining section 113 assigns channels such that communication crossing does not occur among the terminal apparatuses. Information (referred to as "communication channel specifying information") specifying the communication channel determined for the first terminal apparatus 101 is transmitted through the communication section 111 of the management center 110, through the cable communication network 122, through the wireless communication base station 121, and to the first terminal apparatus 101.

The second wireless communication section 104 of the first terminal apparatus 101 having received the determined communication channel specifying information transfers the communication channel specifying information to the computer (main body) 103. The computer (main body) 103 transfers the communication channel specifying information to the first wireless communication section 102. The first wireless communication section 102 transmits the communication channel specifying information to the second terminal apparatus 106, and then the third wireless communication section 108 receives the communication channel specifying information. After that, the first wireless communication section 102 and the third wireless communication section 108 of the second terminal apparatus 106 perform data communication with each other through the specified communication channel.

Image information generated by the computer (main body) 103 is transferred to the first wireless communication section 102. The first wireless communication section 102 transmits the image information to the third wireless communication section 108. The third wireless communication section 108 transfers the image information to the displaying section 107. The displaying section 107 displays the screen depending on the image information. The displaying section 107 has a function of touch panel and the like, whereby the displaying section 107 transmits a touch panel input signal through the third wireless communication section 108, through the first wireless communication section 102, and to the computer (main body) 103.

In the wireless communication system of the present embodiment, the second terminal apparatus 106 is assumed to be always placed near the first terminal apparatus 101. This assumption is satisfied in almost all cases. Further, in systems for transferring large data such as image information by wireless, the reach of radio waves is short. Accordingly, the present system depending on this assumption does not face a substantial problem.

FIG. 2 is a flow chart of the wireless communication system of Embodiment 1 of the present invention.

In FIG. 2, firstly, in step 201, the GPS position detecting section 105 in the first terminal apparatus 101 detects the position of the first terminal apparatus 101. In step 202, the second wireless communication section 104 transmits the detected positional information to the management center 110.

In step 203, the communication section 111 in the management center 110 receives the positional information of each first terminal apparatus 101. In step 204, the positional information recording section 112 records the positional information of each first terminal apparatus 101 into the data base. In step 205, the channel determining section 113 determines communication channels each for a first terminal apparatus 101 and a second terminal apparatus 106, such that communication crossing does not occur. In step 206, the communication section 111 transmits the communication channel specifying information for each first terminal apparatus 101 to the first terminal apparatus 101.

In step 207, the second wireless communication section 104 in the first terminal apparatus 101 receives the communication channel specifying information for the first terminal apparatus 101. In step 208, the second wireless communication section 104 notifies the communication channel specifying information to the computer (main body) 103. In step 209, the computer (main body) 103 then notifies the communication channel specifying information to the first wireless communication section 102. In step 210, the first wireless communication section 102 transmits the communication channel specifying information to the second terminal apparatus 106. In step 211, the computer (main body) 103 communicates with the displaying section 107 via the first wireless communication section 102 and the third wireless communication section 108.

In step 212, the third wireless communication section 108 in the second terminal apparatus 106 receives the communication channel specifying information. In step 213, the displaying section 107 communicates with the computer (main body) 103 via the third wireless communication section 108 and the first wireless communication section 102. The first wireless communication section 102 and the third wireless communication section 108 perform wireless communication with each other through the communication channel in question.

FIG. 3 is a flow chart of the wireless communication (between the first terminal apparatus and the second terminal apparatus) system of Embodiment 1 of the present invention.

In FIG. 3, in step 301, the first wireless communication section 102 of the first terminal apparatus 101 starts communication through a specific communication channel (this is generally the communication channel specified by the communication channel specifying information).

In step 302, the third wireless communication section 108 of the second terminal apparatus 106 determines whether the first terminal apparatus 101 and the second terminal apparatus 106 can communicate with each other or not. In case of a positive result, the flow proceeds to step 309. Otherwise, the flow proceeds to step 303, where the communication channel through which the first wireless communication section 102 is transmitting is searched for. The step 303 consists of (sub-)steps 304–308.

In step 304, an initial value is set for the communication channel (CH1 in the present embodiment). In step 305, it is determined whether the radio wave intensity reaches or exceeds a threshold value, or not. In case that the intensity does not reach the threshold value, the flow proceeds to step 306, where the communication channel number is incremented, and then the flow returns to step 305. In case that the intensity reaches or exceeds the threshold value, the flow proceeds to step 307, where it is determined whether the received information contains a specific identifier or not. Here, the specific identifier is information permitting the identification of a properly corresponding first terminal apparatus to be paired with the second terminal apparatus 106 among other first terminal apparatuses. For example, the specific identifier is an identifier specific to the first terminal apparatus or the second terminal apparatus in question. The third wireless communication section 108 stores the specific identifier. In case that the specific identifier is not contained, the flow proceeds to step 308, where the communication channel number is incremented, and then the flow returns to step 305. In case that the specific identifier is contained, the step 303 is completed, and then the flow proceeds to step 309.

In step 309, the second terminal apparatus 106 communicates with the first terminal apparatus 101 through the fixed communication channel.

In step 310, the first terminal apparatus 101 communicates with the second terminal apparatus 106 through this communication channel.

<Embodiment 2>

A wireless communication system of Embodiment 2 of the present invention is described below with reference to FIGS. 4 and 5. The difference from Embodiment 1 is that the second terminal apparatus further comprises a fourth wireless communication section and that the fourth wireless communication section receives communication channel specifying information directly from the management center.

FIG. 4 is a configuration diagram of a wireless communication system of Embodiment 2 of the present invention. The difference from FIG. 1 is that the second terminal apparatus further comprises a fourth wireless communication section.

In FIG. 4, numeral 101 indicates a first terminal apparatus. Numeral 106 indicates a second terminal apparatus. Numeral 110 indicates a management center. Numeral 120 indicates a GPS satellite. Numeral 121 indicates a wireless communication base station. Numeral 122 indicates a cable communication network. The first terminal apparatus 101 comprises a first wireless communication section 102, a computer (main body) 103, a second wireless communication section 104, and a GPS position detecting section 105. The second terminal apparatus 106 comprises a displaying section 107, a third wireless communication section 108, and a fourth wireless communication section 109. The management center 110 comprises a communication section 111, a positional information recording section 112, and a channel determining section 113.

The GPS position detecting section 105 detects the position of itself (the first terminal apparatus 101) using the GPS satellite 120. The GPS position detecting section 105 notifies the obtained positional information to the second wireless communication section 104. The second wireless communication section 104 transmits the positional information of the first terminal apparatus 101 to the management center 110. The radio waves (positional information) output from the second wireless communication section 104 are received by the wireless communication base station 121. The positional information of the first terminal apparatus 101 is then notified to the management center 110 via the cable communication network 122.

The communication section 111 of the management center 110 notifies the notified positional information of the first terminal apparatus 101 to the positional information recording section 112. The positional information recording section 112 records the positional information into a data base. The channel determining section 113 determines a communication channel for the first terminal apparatus 101 and the second terminal apparatus 106. The management center 110 receives the positional information of a plurality of first terminal apparatuses thereby to record and manage it. The channel determining section 113 assigns channels such that communication crossing does not occur among the terminal apparatuses. Information (referred to as "communication channel specifying information") specifying the communication channel determined for the first terminal apparatus 101 and the second terminal apparatus 106 is transmitted through the communication section 111 of the management center 110, through the cable communication network 122, through the wireless communication base station 121, and to the first terminal apparatus 101 and the second terminal apparatus 106.

The second wireless communication section 104 of the first terminal apparatus 101 having received the communication channel specifying information determined for the first terminal apparatus 101 and the second terminal apparatus 106 transfers the communication channel specifying information through the computer (main body) 103 to the first wireless communication section 102. Similarly, the fourth wireless communication section 109 of the second terminal apparatus 106 having received the communication channel specifying information determined for the first terminal apparatus 101 and the second terminal apparatus 106 transfers the communication channel specifying information to the third wireless communication section 108. After that, the first wireless communication section 102 and the third wireless communication section 108 of the second terminal apparatus 106 perform data communication with each other through this communication channel.

Image information generated by the computer (main body) 103 is transferred to the first wireless communication section 102. The first wireless communication section 102 transmits the image information to the third wireless communication section 108. The third wireless communication section 108 transfers the image information to the displaying section 107. The displaying section 107 displays the screen depending on the image information. The displaying section 107 has a function of touch panel and the like, whereby the displaying section 107 transmits a touch panel input signal through the third wireless communication section 108, through the first wireless communication section 102, and to the computer (main body) 103. The first wireless communication section 102 and the third wireless communication section 108 communicate with each other through the communication channel specified by the communication channel specifying information.

FIG. 5 is a flow chart of the wireless communication system of Embodiment 2 of the present invention. The difference from FIG. 2 is that the management center notifies the communication channel directly to the second terminal apparatus.

In FIG. 5, firstly, in step 501, the GPS position detecting section 105 in the first terminal apparatus 101 detects the position of the first terminal apparatus 101. In step 502, the second wireless communication section 104 transmits the detected positional information to the management center 110.

In step 503, the communication section 111 in the management center 110 receives the positional information of each first terminal apparatus 101. In step 504, the positional information recording section 112 records the positional information of each first terminal apparatus 101 into the data base. In step 505, the channel determining section 113 determines communication channels each for a first terminal apparatus 101 and a second terminal apparatus 106, such that communication crossing does not occur. Here, the communication channel (communication channel A) through which the first terminal apparatus 101 transfers information to the second terminal apparatus 106 may be identical to and may be different from the communication channel (communication channel B) through which the second terminal apparatus 106 transfers information to the first terminal apparatus 101. In step 506, the communication section 111 transmits the communication channel specifying information for each first terminal apparatus 101 and second terminal apparatus 106 to the first terminal apparatus 101.

In step 507, the second wireless communication section 104 in the first terminal apparatus 101 receives the communication channel specifying information for the first terminal apparatus 101 and the second terminal apparatus 106. In step 508, the second wireless communication section 104 notifies the communication channel specifying information through the computer (main body) 103 to the first wireless communication section 102. In step 509, the computer (main body) 103 communicates with the displaying section 107 via the first wireless communication section 102 and the third wireless communication section 108. The first wireless communication section 102 transfers information to the third wireless communication section 108 through the communication channel A specified by the communication channel specifying information.

Similarly, in step 510, the communication section 111 of the management center 110 transmits the communication channel specifying information for each first terminal apparatus 101 and second terminal apparatus 106 to the second terminal apparatus 106. In step 511, the fourth wireless communication section 109 in the second terminal apparatus 106 receives the communication channel specifying information for the first terminal apparatus 101 and the second terminal apparatus 106. In step 512, the fourth wireless communication section 109 notifies the communication channel specifying information to the third wireless communication section 108. In step 513, the displaying section 107 communicates with the computer (main body) 103 via the third wireless communication section 108 and the first wireless communication section 102. The third wireless communication section 108 transfers information to the first wireless communication section 102 through the communication channel B specified by the communication channel specifying information.

<Embodiment 3>

A wireless communication system of Embodiment 3 of the present invention is described below with reference to FIGS. 6 and 7. The difference from Embodiment 1 is that the communication channels for computers are determined depending on the communication channels for wireless telephones.

FIG. 6 is a configuration diagram of a wireless communication system of Embodiment 3 of the present invention. The difference from FIG. 1 is that the GPS satellite, the GPS position detecting section, and the management center are omitted and that a telephone station center is added.

In FIG. 6, numeral 101 indicates a first terminal apparatus. Numeral 106 indicates a second terminal apparatus. Numeral 121 indicates a wireless communication base station. Numeral 122 indicates a cable communication network. Numeral 130 indicates a telephone station center. The first terminal apparatus 101 comprises a first wireless communication section 102, a computer (main body) 103, and a second wireless communication section 104. The second terminal apparatus 106 comprises a displaying section 107 and a third wireless communication section 108. The telephone station center 130 comprises a communication section 131, a positional information generating section 132, a positional information recording section 133, and a channel determining section 134.

The second wireless communication section 104 communicates with the wireless communication base station 121.

The wireless communication base station 121 receives the radio waves output by the second wireless communication section 104 of the first terminal apparatus 101, and then transfers the information of received radio wave intensity to the telephone station center 130. The communication section 131 of the telephone station center 130 then transfers the information of received radio wave intensity to the positional information generating section 132. The positional information generating section 132 generates positional information indicating which zone (or cell) each first terminal apparatus 101 is located in, depending on the information of radio wave intensity. In general, it is determined that each first terminal apparatus 101 is located in the zone (or cell) of a wireless communication base station receiving the most intense radio waves. The positional information generating section 132 notifies the generated positional information of each first terminal apparatus 101 to the positional information recording section 133. The positional information recording section 133 records the positional information into a data base.

The channel determining section 134 determines a communication channel (second communication channel) for each first terminal apparatus 101 within the cell. The communication channel determined by the telephone station center is a communication channel which can be used for portable telephones and the like. Accordingly, the telephone station center determines also communication channels for ordinary portable telephones. The telephone station center 130 receives the positional information of a plurality of first terminal apparatuses thereby to record and manage it. The channel determining section 134 assigns communication channels (second communication channels) such that communication crossing does not occur among the terminal apparatuses (and the portable telephones) within the cell. Information (referred to as "second communication channel specifying information") specifying the communication channel (second communication channel) determined for the first terminal apparatus 101 within the cell is transmitted through the communication section 131 of the telephone station center 130, through the cable communication network 122, through the wireless communication base station 121, and to the second wireless communication section 104 of the first terminal apparatus 101.

The second wireless communication section 104 of the first terminal apparatus 101 having received the determined second communication channel specifying information communicates with the wireless communication base station 121 through the second communication channel. The second wireless communication section 104 further notifies the second communication channel specifying information to the computer (main body) 103. The computer (main body) 103 determines a first communication channel which is a communication channel between the first terminal apparatus 101 and the second terminal apparatus 106, depending on the communication channel (second communication channel) of the first terminal apparatus 101 within the cell. The computer (main body) 103 notifies the first communication channel specifying information to the first wireless communication section 102. The first wireless communication section 102 transmits the first communication channel specifying information to the third wireless communication section 108 of the second terminal apparatus 106. The third wireless communication section 108 receives the first communication channel specifying information. After that, the computer (main body) 103 and the displaying section 107 perform data communication with each other via the first wireless communication section 102 and the third wireless communication section 108. The first wireless communication section 102 and the third wireless communication section 108 communicate with each other through the first communication channel.

Image information generated by the computer (main body) 103 is transferred to the first wireless communication section 102. The first wireless communication section 102 transmits the image information to the third wireless communication section 108. The third wireless communication section 108 transfers the image information to the displaying section 107. The displaying section 107 displays the screen depending on the image information. The displaying section 107 has a function of touch panel and the like, whereby the displaying section 107 transmits a touch panel input signal through the third wireless communication section 108, through the first wireless communication section 102, and to the computer (main body) 103.

For example, it is assumed that the communication channels (second communication channels) of portable telephones are CH1–CH20 and that the communication channels (first communication channels) between the first terminal apparatuses 101 and the second terminal apparatuses 106 are also CH1–CH20. Here, it should be noted that the first communication channels use frequency bands different from those of the second communication channels even in case of the same channel numbers. For example, in case that the second communication channel is CH5, the first communication channel is set to be CH5. Further, for example, in case that the second communication channel is CH8, the first communication channel is set to be CH8. Since the communication channels (second communication channels) of portable telephones are selected so as to be free from communication crossing, the first communication channels are also free from communication crossing.

FIG. 7 is a flow chart of the wireless communication system of Embodiment 3 of the present invention.

In FIG. 7, firstly, in step 701, the second wireless communication section 104 in the first terminal apparatus 101 communicates with the wireless communication base station 121. The wireless communication base station 121 receives the radio waves output by the second wireless communication section 104, and then transfers the information of radio wave intensity through the cable communication network 122 to the telephone station center 130.

In step 702, the communication section 131 of the telephone station center 130 receives the information of radio wave intensity. In step 703, the positional information generating section 132 generates the positional information of each first terminal apparatus 101 (and ordinary portable telephone), depending on the radio wave intensity of each first terminal apparatus 101. In general, it is determined that each first terminal apparatus 101 is located in the zone (or cell) of a wireless communication base station receiving the most intense radio waves. In step 704, the positional information recording section 133 records the positional information of each first terminal apparatus 101 into a database. In step 705, the channel determining section 134 determines a communication channel (second communication channel) for each first terminal apparatus 101 (and ordinary portable telephone) within the cell, such that communication crossing does not occur. In step 706, the communication section 131 transmits the second communication channel specifying information for each first terminal apparatus 101, to the first terminal apparatus 101 (and ordinary portable telephone).

In step 707, the second wireless communication section 104 in the first terminal apparatus 101 receives the second communication channel specifying information for the first terminal apparatus 101. The second wireless communication section 104 communicates with the wireless communication base station 121 through the second communication channel. In step 708, the second wireless communication section 104 notifies the second communication channel specifying information to the computer (main body) 103. In step 709, the computer (main body) 103 determines a communication channel (first communication channel) for the communication with the second terminal apparatus 106, depending on the second communication channel for the first terminal apparatus 101. In step 710, the computer (main body) 103 notifies the information (referred to as "a first communication channel specifying information") of the communication channel (first communication channel) for the communication with the second terminal apparatus 106, to the first wireless communication section 102. In step 711, the first wireless communication section 102 transmits the first communication channel specifying information to the second terminal apparatus 106. In step 712, the computer (main body) 103 communicates with the displaying section 107 via the first wireless communication section 102 and the third wireless communication section 108. The first wireless communication section 102 communicates with the third wireless communication section 108 through the first communication channel.

In step 713, the third wireless communication section 108 of the second terminal apparatus 106 receives the first communication channel specifying information. In step 714, the displaying section 107 communicates with the computer (main body) 103 via the third wireless communication section 108 and the first wireless communication section 102. The third wireless communication section 108 communicates with the first wireless communication section 102 through the first communication channel.

The second communication channel is a communication channel between the first terminal apparatus 101 and the wireless communication base station 121. The first communication channel is a communication channel between the first terminal apparatus 101 and the second terminal apparatus 106.

In the present embodiment, it is preferred that the number of first communication channels is greater than or equal to the number of second communication channels. The purpose of this is to avoid the communication crossing when a first communication channel is determined depending on a second communication channel. Further, it is preferred that the maximum communication distance between the first terminal apparatus and the second terminal apparatus is smaller than or equal to the maximum communication distance between portable telephones. The purpose of this is to avoid the communication crossing among first terminal apparatuses in nearby zones. The telephone station center 130 selects the second communication channels such that the communication crossing does not occur among adjacent zones. In accordance with the present invention, an inexpensive wireless communication system free from communication crossing can be realized using a system for preventing communication crossing in a wireless telephone system without a management center.

<Embodiment 4>

A wireless communication system of Embodiment 4 of the present invention is described below with reference to FIGS. 8 and 9. The difference from Embodiment 1 is that the positional information is obtained from a telephone station center.

FIG. 8 is a configuration diagram of a wireless communication system of Embodiment 4 of the present invention. The difference from FIG. 1 is that the GPS satellite and the GPS position detecting section are omitted and that a telephone station center is added.

In FIG. 8, numeral 101 indicates a first terminal apparatus. Numeral 106 indicates a second terminal apparatus. Numeral 121 indicates a wireless communication base station. Numeral 122 indicates a cable communication network. Numeral 130 indicates a telephone station center. The first terminal apparatus 101 comprises a first wireless communication section 102, a computer (main body) 103, and a second wireless communication section 104. The second terminal apparatus 106 comprises a displaying section 107 and a third wireless communication section 108. The management center 110 comprises a communication section 111, a positional information recording section 112, and a channel determining section 113. The telephone station center 130 comprises a communication section 131, a positional information generating section 132, a positional information recording section 133, and a channel determining section 134.

The second wireless communication section 104 communicates with the wireless communication base station 121.

The wireless communication base station 121 receives the radio waves output by the second wireless communication section 104 of the first terminal apparatus 101, and then transfers the information of received radio wave intensity to the telephone station center 130. The communication section 131 of the telephone station center 130 then transfers the information of received radio wave intensity to the positional information generating section 132. The positional information generating section 132 generates positional information indicating which zone (or cell) each first terminal apparatus 101 is located in, depending on the information of radio wave intensity. In general, it is determined that each first terminal apparatus 101 is located in the zone (or cell) of a wireless communication base station receiving the most intense radio waves. The positional information generating section 132 notifies the generated positional information of each first terminal apparatus 101 to the positional information recording section 133. The positional information recording section 133 records the positional information into a data base.

The channel determining section 134 determines a communication channel (second communication channel) for each first terminal apparatus 101 within the cell. The telephone station center 130 receives the positional information of a plurality of first terminal apparatuses thereby to record and manage it. The channel determining section 134 assigns communication channels (second communication channels) such that communication crossing does not occur among the terminal apparatuses within the cell. The positional information and the information (referred to as "second communication channel specifying information") specifying the communication channel (second communication channel) generated for each first terminal apparatus 101 are transmitted through the communication section 131 of the telephone station center 130, through the cable communication network 122, through the wireless communication base station 121, and to the first terminal apparatus 101.

The second wireless communication section 104 of the first terminal apparatus 101 having received both the positional information and the second communication channel specifying information generated for each first terminal apparatus 101 communicates with the wireless communication base station 121 through the second communication channel. The second wireless communication section 104 further transmits the received positional information to the management center 110.

The communication section 111 of the management center 110 notifies the received positional information of the first terminal apparatus 101 to the positional information recording section 112. The positional information recording section 112 records the positional information into a data base. The channel determining section 113 determines a communication channel (first communication channel) for the first terminal apparatus 101. The management center 110 receives the positional information of a plurality of first terminal apparatuses thereby to record and manage it. The channel determining section 113 assigns first communication channels such that communication crossing does not occur among the first terminal apparatuses. Information (referred to as "first communication channel specifying information") specifying the first communication channel determined for the first terminal apparatus 101 is transmitted through the communication section 111 of the management center 110, through the cable communication network 122, through the wireless communication base station 121, and to the second wireless communication section 104 of the first terminal apparatus 101.

The second wireless communication section 104 of the first terminal apparatus 101 having received the determined first communication channel specifying information notifies the first communication channel specifying information to the computer (main body) 103. The computer (main body) 103 notifies the first communication channel specifying information to the first wireless communication section 102. The first wireless communication section 102 transmits the first communication channel specifying information to the second terminal apparatus 106. The third wireless communication section 108 receives the first communication channel specifying information. After that, the computer (main body) 103 and the displaying section 107 perform data communication with each other via the first wireless communication section 102 and the third wireless communication section 108. The first wireless communication section 102 communicates with the third wireless communication section 108 through the first communication channel.

Image information generated by the computer (main body) 103 is transferred to the first wireless communication section 102. The first wireless communication section 102 transmits the image information to the third wireless communication section 108. The third wireless communication section 108 transfers the image information to the displaying section 107. The displaying section 107 displays the screen depending on the image information. The displaying section 107 has a function of touch panel and the like, whereby the displaying section 107 transmits a touch panel input signal through the third wireless communication section 108, through the first wireless communication section 102, and to the computer (main body) 103.

FIG. 9 is a flow chart of the wireless communication system of Embodiment 4 of the present invention.

In FIG. 9, firstly, in step 901, the second wireless communication section 104 in the first terminal apparatus 101 communicates with the wireless communication base station 121. The wireless communication base station 121 receives the radio waves output by the second wireless communication section 104, and then transfers the information of radio wave intensity through the cable communication network 122 to the telephone station center 130.

In step 902, the communication section 131 of the telephone station center 130 receives the information of radio wave intensity. In step 903, the positional information generating section 132 generates the positional information of each first terminal apparatus 101, depending on the radio wave intensity of each first terminal apparatus 101. In general, it is determined that each first terminal apparatus 101 is located in the zone (or cell) of a wireless communication base station receiving the most intense radio waves. In step 904, the positional information recording section 133 records the positional information of each first terminal apparatus 101 into a data base. In step 905, the channel determining section 134 determines a communication channel (second communication channel) for each first terminal apparatus 101 within the cell, such that communication crossing does not occur. In step 906, the communication section 131 transmits both the positional information and the second communication channel specifying information for each first terminal apparatus 101, to the first terminal apparatus 101.

In step 907, the second wireless communication section 104 in the first terminal apparatus 101 receives both the positional information and the second communication channel specifying information for the first terminal apparatus 101. The second wireless communication section 104 communicates with the wireless communication base station 121 through the second communication channel. In step 908, the second wireless communication section 104 transmits the positional information of each first terminal apparatus 101 to the management center 110.

In step 909, the communication section 111 in the management center 110 receives the positional information of each first terminal apparatus 101. In step 910, the positional information recording section 112 records the positional information of each first terminal apparatus 101 into a data base. In step 911, The channel determining section 113 determines first communication channels such that communication crossing does not occur. In step 912, the communication section 111 transmits the first communication channel specifying information for each first terminal apparatus 101 to the second wireless communication section 104 of the first terminal apparatus 101.

In step 913, the second wireless communication section 104 in the first terminal apparatus 101 receives the first communication channel specifying information for the first terminal apparatus 101. In step 914, the second wireless communication section 104 notifies the first communication channel specifying information to the computer (main body) 103. In step 915, the computer (main body) 103 notifies the first communication channel specifying information to the first wireless communication section 102. In step 916, the first wireless communication section 102 transmits the first communication channel specifying information to the third wireless communication section 108 of the second terminal apparatus 106. In step 917, the computer (main body) 103 communicates with the displaying section 107 via the first wireless communication section 102 and the third wireless communication section 108. The first wireless communication section 102 communicates with the third wireless communication section 108 through the first communication channel.

In step 918, the third wireless communication section 108 in the second terminal apparatus 106 receives the first communication channel specifying information. In step 919, the displaying section 107 communicates with the computer (main body) 103 via the third wireless communication section 108 and the first wireless communication section 102. The third wireless communication section 108 communicates with the first wireless communication section 102 through the first communication channel.

For example, the second terminal apparatus 106 is provided with either a GPS position detecting section or a fourth wireless communication section for communicating with the wireless communication base station 121. Then, the positional information of the second terminal apparatus 106 is obtained similarly to the above-mentioned embodiment, whereby the first communication channel (communication channel between the first wireless communication section 102 and the third wireless communication section 108) can be determine using the positional information of the second terminal apparatus 106.

The second terminal apparatus 106 can move freely within a certain distance from the first terminal apparatus 101. Using both the positional information of the first terminal apparatus 101 and the information of the relative position between the first terminal apparatus 101 and the second terminal apparatus 106, the first communication channel can be determined automatically. By virtue of this, in case that the second terminal apparatus 106 comes near to another first terminal apparatus using the same channel, the first communication channel (communication channel between the first wireless communication section 102 and the third wireless communication section 108) can be changed automatically.

In accordance with a wireless communication apparatus of the present invention, communication channels are determined in a management center by using positional information obtained from GPS satellite and the like. By virtue of this, computers (main bodies) and corresponding displaying sections can communicate with each other without communication crossing even in case that a plurality of those apparatuses in which the computer (main body) and the displaying section can be used in separate units are used nearby to each other.

In accordance with a wireless communication apparatus of the present invention, communication channels are determined depending on the communication channel for portable telephones. By virtue of this, realizable is an inexpensive wireless communication system in which a first terminal apparatus (comprising a computer (main body)) can performs data communication with a second terminal apparatus (comprising a displaying section) without communication crossing even in case that a plurality of those apparatuses in which the computer (main body) and the displaying section can be used in separate units are used nearby to each other.

Although the invention has been described in some detail dealing with the preferred embodiments, the configuration details of any of the preferred embodiments disclosed herein may be changed or modified, and any changes in the combination or order of elements thereof can be accomplished without departing from the spirit and scope of the invention as set forth in the appended claims.

What is claimed is:

1. A wireless communication system comprising a first terminal apparatus and a second terminal apparatus, wherein said first terminal apparatus comprises:

a computer for generating image information;

a first wireless communication section for performing first wireless communication through a first communication channel defined depending on a second communication channel thereby to transmit said image information to a third wireless communication section of said second terminal apparatus; and a second wireless communication section for receiving, from a wireless communication base station, second communication channel specifying information specifying said second communication channel which is a communication channel used for wireless communication with said wireless communication base station; and wherein said second terminal apparatus comprises:

said third wireless communication section for receiving said image information; and a displaying section for displaying said image information.

2. A method for controlling a wireless communication system comprising a first terminal apparatus and a second terminal apparatus, said method comprising:

wireless communication step in which said first terminal apparatus receives, from a wireless communication base station, second communication channel specifying information specifying a second communication channel which is a communication channel used for wireless communication with said wireless communication base station;

image information generating step in which said first terminal apparatus generates image information;

wireless communication step in which said first terminal apparatus transmits said image information to said second terminal apparatus by wireless through a first communication channel defined depending on said second communication channel;

wireless communication step in which said second terminal apparatus receives said image information by wireless; and displaying step in which said second terminal apparatus displays said image information.

* * * * *